UNITED STATES PATENT OFFICE.

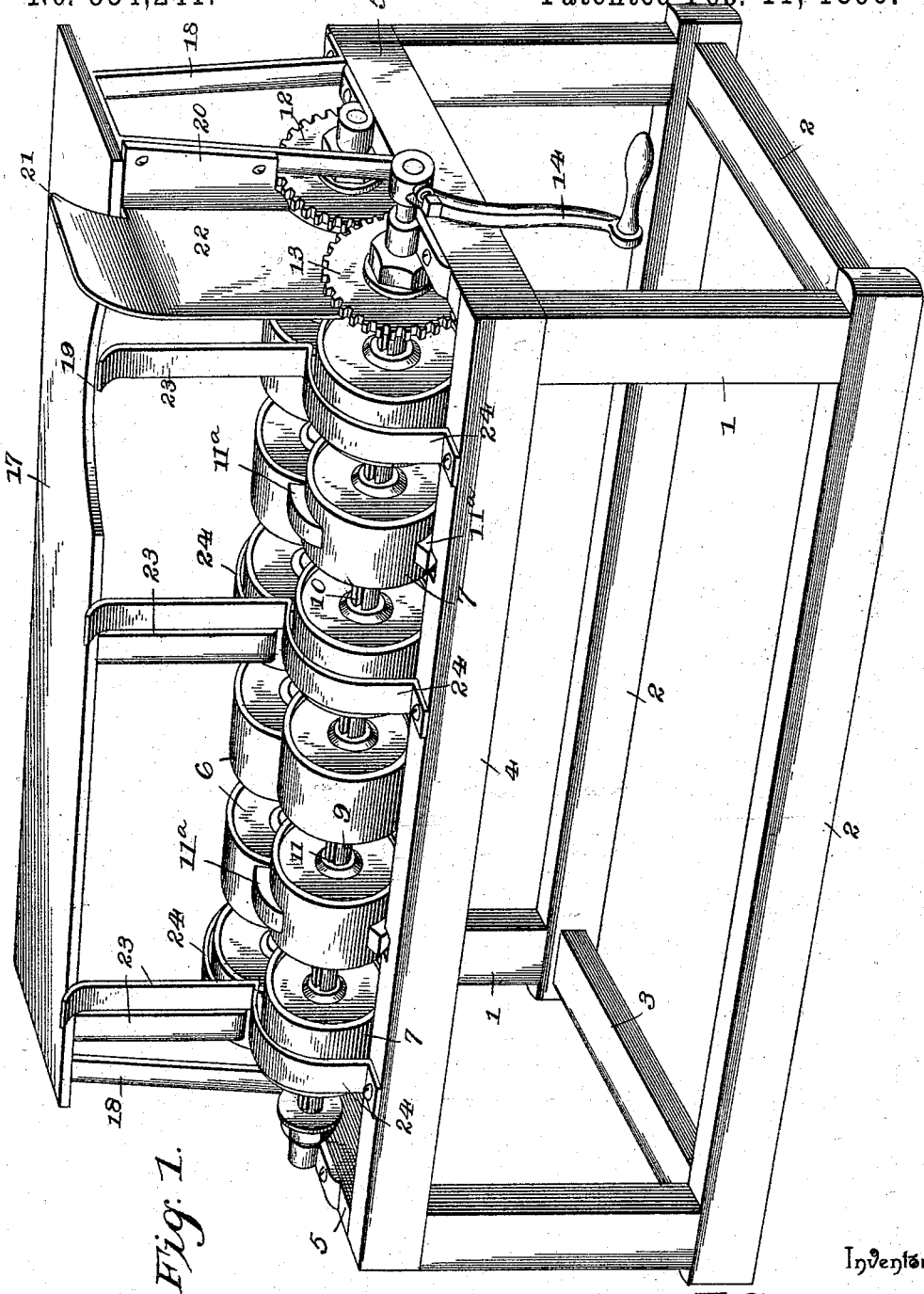

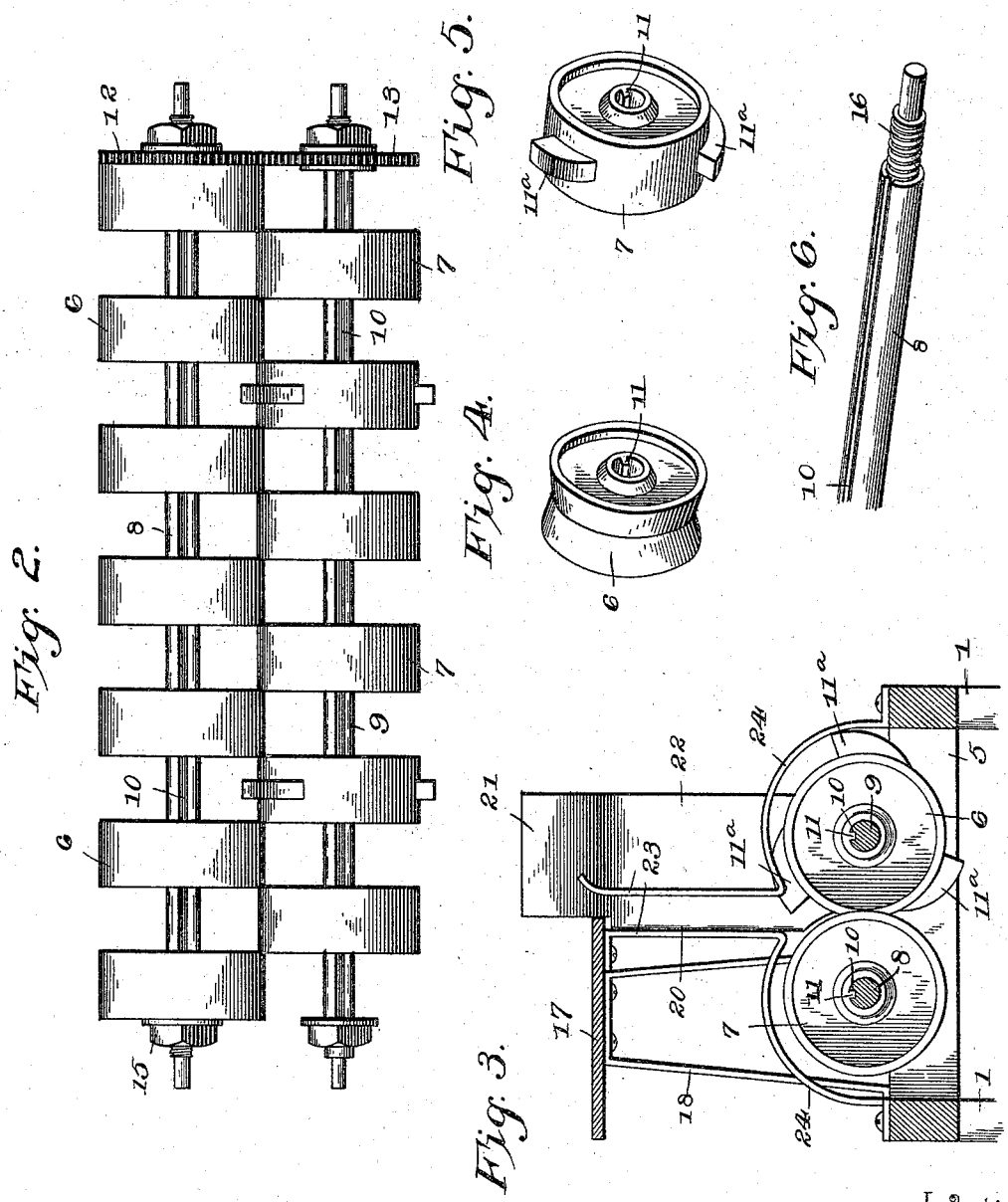

ERNEST E. CHAPMAN AND SIMON S. CREIDER, OF STERLING, ILLINOIS.

CORN-SNAPPER AND FODDER-CUTTER.

SPECIFICATION forming part of Letters Patent No. 554,241, dated February 11, 1896.

Application filed March 20, 1895. Serial No. 542,524. (No model.)

*To all whom it may concern:*

Be it known that we, ERNEST E. CHAPMAN and SIMON S. CREIDER, citizens of the United States, residing at Sterling, in the county of Whiteside and State of Illinois, have invented a new and useful Corn-Snapper and Fodder-Cutter, of which the following is a specification.

This invention relates to machinery for snapping or severing the ears of corn from the stalks, and at the same time cutting the latter in required lengths for purposes of feed, and has for its object to reduce to a minimum the hazardousness in operating corn-husking, fodder, and feed-cutting machinery; to cut a required amount of fodder or feed in a given time by the expenditure of less power than has been feasible by this class of machinery as heretofore constructed, and which will sever the ears of corn from the stalks and cut the latter in the required lengths and deliver the same upon a carrier without liability of clogging or choking, which has been a source of annoyance in apparatus designed for the same purpose as the present invention.

The improvement consists, essentially, of the novel features and the peculiar construction and combination of the parts which hereinafter will be more fully set forth and claimed, and which are shown in the accompanying drawings, in which—

Figure 1 is a perspective view of a machine constructed in accordance with and embodying the essence of the present invention. Fig. 2 is a top plan view of the cutting apparatus. Fig. 3 is a cross-section showing the relative disposition of the vertical guides and the oppositely-disposed cutters. Fig. 4 is a detail view of a cutter having its peripheral surface centrally depressed. Fig. 5 is a detail view of a cutter having peripheral projections to engage with the stalks and advance the latter in a positive manner between the oppositely-disposed cutters. Fig. 6 is a detail view of the end portion of the shaft upon which the cutters are loosely mounted, showing the threaded portion which receives the nut by means of which the cutters are caused to co-operate with sufficient pressure to perform the desired work.

The frame for supporting the operating parts of the machine may be of suitable construction, and, as shown, comprises corner-posts 1, lower longitudinal sills, 2, lower end beams, 3, upper side beams, 4, and upper end beams, 5, which are jointed at their meeting ends in any desired manner.

The cutting apparatus comprises, essentially, two series of rotary cutters 6 and 7, disposed in parallel relation and in substantially the same horizontal plane, and so related that the cutters of one series are disposed opposite the spaces between the cutters of the other series, the edge portions of the two series of cutters overlapping a short distance, so as to operate upon the stalks and grain to be cut by a shearing action. The cutters of each series will be similarly formed, and are circular and have a breadth corresponding to the length to which it is designed to cut the feed or fodder, and they are loosely mounted upon shafts and caused to revolve therewith by means of any desired form of feather-and-spline connection. The cutters 6 are mounted upon a shaft 8, and the cutters 7 upon a similar shaft 9, the two shafts 8 and 9 being journaled at their ends in suitable bearings provided on the end beams 5 of the framework.

In the preferable construction of the feather-and-spline connection between the shafts and the cutters a groove 10 is formed longitudinally in the shafts and a corresponding projection 11 extends inwardly from the central opening of the cutters, so as to engage with and operate in the groove 10. By this means the cutters and shafts are caused to revolve as a unit and the cutters are free to move upon the shafts to attain the required lateral pressure to hold the overlapping edge portions of the cutters in working relation, so as to perform the work of snapping the ears of corn from the stalk and cutting the latter in the required lengths.

The several cutters are circular in outline and approximate the form of pulleys—that is, they have an extended surface between their edges or sides. The surface between the sides of a cutter may be straight or have any desired outline, the general form being straight. However, said surface may be depressed between the sides, as shown in Fig. 4, which results in sharper cutting-edges, because the angle between the sides and peripheral surface is more acute than in any of the other forms.

In general practice the two sets of cutters 6 and 7 are revolved in opposite directions and toward each other, thereby crowding the stalks into the trough formed between their opposing sides, so as to insure the proper cutting of the stalks or grain. However, to insure a positive and forced feed it has been found expedient to provide some of the cutters with peripheral projections 11ª, which engage with the stalks and cause them to pass between the co-operating cutters. These projections 11ª may be provided in sufficient number and are beveled from their front or advancing ends to the surface of the cutter, so as to provide sufficient clearance space for the succeeding projection. This construction is shown most clearly in Fig. 5. In practice one of these forced-feed cutters will be provided and located near each end of the cutting apparatus, so as to engage with the end portions of the stalks and carry the latter forward between the cutters in a positive manner.

Gear-wheels 12 and 13, of the same pitch, are secured upon the respective shafts 8 and 9 so as to cause the latter to revolve in unison and at the same rate of speed. Motion is imparted to one of the shafts and is transmitted to the other by means of the gear-wheels 12 and 13, any suitable power being provided to rotate the said shaft. As shown, a crank 14 is secured upon the end of the shaft 9 as a means to rotate the latter by manual force. In operating the machine the crank must be turned so as to cause the cutters 6 and 7 to revolve toward each other, thereby dragging the stalks or grain between the cutters and insuring a rapid cutting of the stalks and grain in the required lengths.

In assembling the parts, the cutters are strung upon their respective shafts, and are arranged so that the cutters on one shaft will come opposite the cutters on the other shaft, the cutters being held in working relation by means of a set or adjusting nut 15 mounted upon the threaded end portion 16 of one of the shafts, as 8. From this it will be seen that a simple means is provided for regulating the pressure on the two series of cutters by means of a single appliance, the latter also serving to compensate for and take up wear.

A table 17 is located over the series of cutters 6, and is supported at its ends upon standards 18 rising from the end beams 5 of the framework, and is provided in its front edge near one end with a curved notch or depression 19 to admit of the free passage of the ears of corn when feeding the stalks from the said table to the cutting apparatus. The front edge of the table is nearly in vertical alignment with the meeting edges of the oppositely-disposed cutters, thereby facilitating the feed of the stalks to the said cutting apparatus. A vertically-disposed chute or butt-board 20 is located at one end of the cutting apparatus and projects above the level of the table 17, said projecting end being curved outwardly, as shown at 21, to form a guide to facilitate the feeding of the stalks from the table to the cutting apparatus. This butt-board or chute is preferably a sheet-metal plate which has its rear end portion 22 bent outwardly and secured to a member of the contiguous standard 18.

Vertical guides 23 are disposed upon each side of a plane passing vertically through the meeting edges of the oppositely-disposed cutters 6 and 7 so as to provide a space for the passage of the stalks or grain to the cutting apparatus. The upper ends of these guides 23 curve in opposite directions to enable the stalks to be readily passed between them when feeding the same to the cutting apparatus. The lower end portions of the guides 23 curve outwardly to conform to the curvature of the cutters, and are attached at their lower ends to the side beams, 4. There may be as many of these guides 23 as desired, and they will be formed from bars or strips of metal which are bent in the required shape, and when placed in position are arranged so as to have the space between the oppositely-disposed guides approximate the diameter of cornstalks so as to admit of the latter being fed one at a time to the cutting apparatus. While this disposition of the guides is preferable, it is obvious that they may be spaced a greater or less distance, as may be required. The lower curved portions 24 of the guides 23 may be arranged to extend over the outer portion of the cutters, thereby providing guards which will prevent the stalks flying outward after being received in the trough formed between the two sets of cutters 6 and 7.

In the operation of the machine the cutters are revolved as herein set forth, and the stalks or grain to be cut are placed upon the table 17, and in the event of stalks the latter are fed rapidly to the cutting apparatus one at a time, the butts being placed against the chute or butt-board 20, so as to properly position the same with reference to the cutting apparatus. The curved notch or recess 19 gives clearance for the ears of corn when feeding the stalks to the machine. As the stalks reach the cutting apparatus the ears of corn are snapped or cut from the stalks and drop over the cutters 6 and 7, and are received upon a suitably-disposed carrier or upon husking-rolls, as may be desired, and the stalks will be cut in the required length by means of the cutters, the severed parts dropping either into a receptacle or upon a conveyer, whichever may be provided.

From what has been said it is obvious that changes in the form, proportion, and the minor details of construction may be resorted to without departing from the principle or sacrificing any of the advantages of this invention.

Having thus described the invention, what is claimed as new is—

1. A machine for the purposes set forth, comprising two sets of smooth-edged circular cutters arranged in parallel relation, the cutters of one set being located opposite the space between the cutters of the opposite set and the two sets of cutters having their edge portions overlapping, and some of the cutters having projections between their cutting-edges, substantially as and for the purpose set forth.

2. In a machine for the purposes specified, the combination with two shafts arranged in parallelism, of circular cutters mounted upon the shafts in alternate relation and having their cutting-edges continuous and overlapping, some of the cutters having peripheral projections between the cutting-edges, which present engaging shoulders at their forward ends and which are beveled rearwardly to the plane of the said cutters, substantially as set forth for the purpose described.

3. In a machine for the purposes described, the combination with two sets of circular cutters arranged in parallelism, of individual vertical guides properly spaced apart and disposed in parallel relation and providing a passage to guide the stalks one at a time to the space between the meeting edges of the oppositely-disposed cutters, substantially as and for the purpose set forth.

4. The combination with two sets of circular cutters arranged in parallelism, of individual vertical guides having their upper portions extending in parallel relation and forming a space opposite the meeting edges of the cutters to direct the stalks thereto, and having their lower portions curved in opposite directions to provide guides, as and for the purpose described.

5. The combination with two sets of circular cutters disposed in parallel relation, of an elevated table having a notch, or recess, in its edge for the purposes set forth, and vertical guides extending from said table to the cutters to give proper direction to the stalks, or grain, to be cut, substantially as set forth.

6. The combination with two sets of circular cutters arranged in parallel relation, of an elevated table, a butt-board near one end of the table, and vertical guides to give proper direction to the stalks, or grain, when feeding the latter from the table to the said cutters, substantially as set forth.

7. In a machine of the character set forth, the combination with two shafts arranged in parallel relation, and means for causing the said shafts to revolve in opposite directions, of circular cutters mounted upon the said shafts in alternate relation, some of the cutters having peripheral projections intermediate of their cutting-edges to cause a forced or positive feed of the stalks, or grain, to be cut to the said cutters, substantially as set forth.

8. A machine for the purposes set forth constructed substantially as herein specified, the same comprising a framework, two shafts disposed in parallelism and geared so as to revolve together in opposite directions, circular cutters mounted upon the shafts in alternate relation and having their edge portions overlapping, said cutters being free to move upon their respective shafts, but mounted so as to revolve therewith, means for creating a lateral pressure upon an end cutter, whereby all the cutters will be held in working relation, an elevated table, a butt-board near one end of the table, and vertical guides between the elevated table and the framework to give proper direction to the stalks when feeding the latter from the table to the said cutters, some of the latter having peripheral projections intermediate of their cutting-edges, as and for the purpose described.

In testimony that we claim the foregoing as our own we have hereto affixed our signatures in the presence of two witnesses.

ERNEST E. CHAPMAN.
SIMON S. CREIDER.

Witnesses:
EDGAR W. CREIDER,
ISAAC KEEN.